Oct. 20, 1931.  W. A. LORENZ  1,828,726
METHOD OF AND APPARATUS FOR FEEDING MOLTEN GLASS
Filed May 5, 1921  3 Sheets-Sheet 1
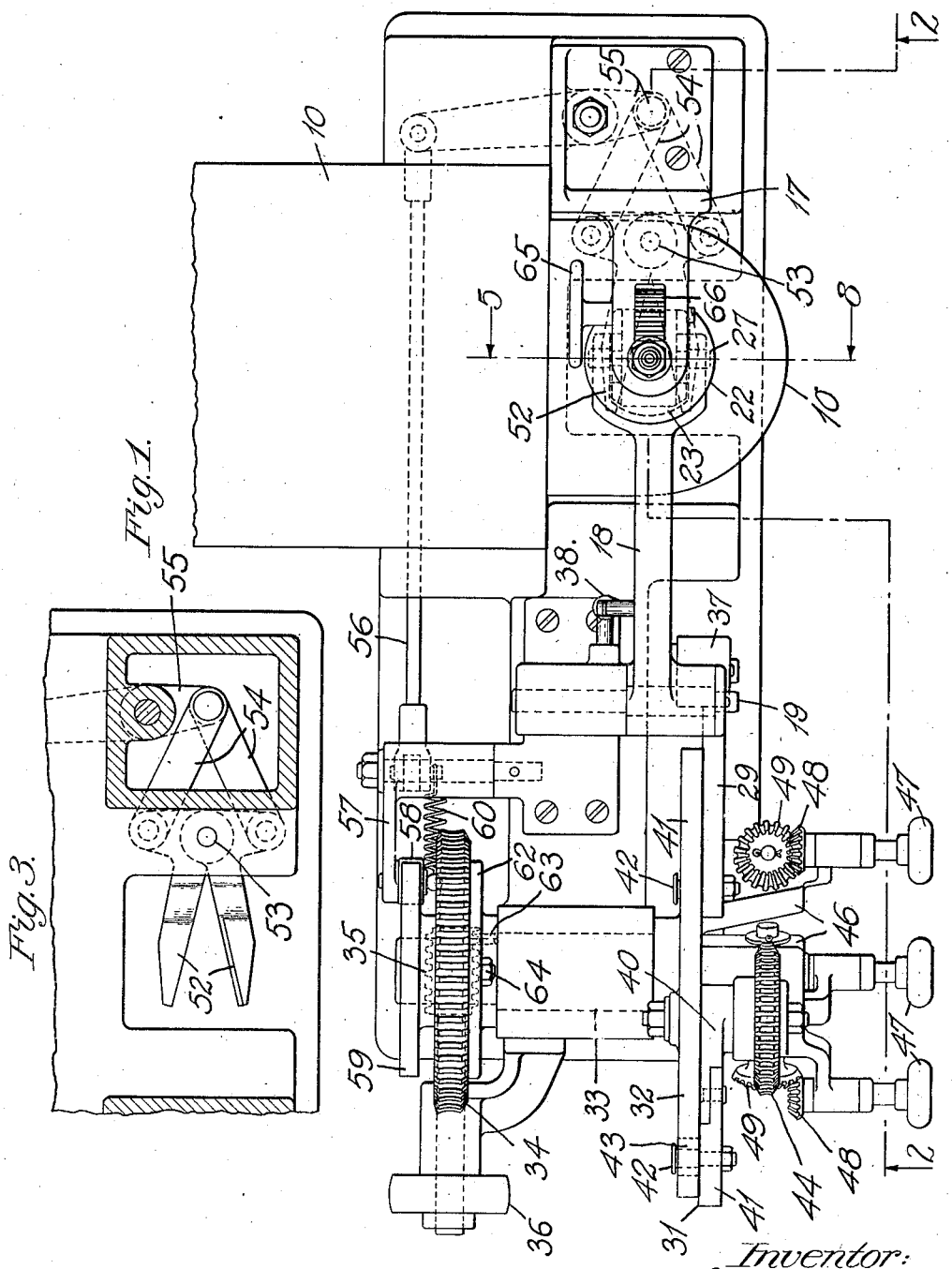
Inventor:
William A. Lorenz
by W. H. Homiss
Att'y.

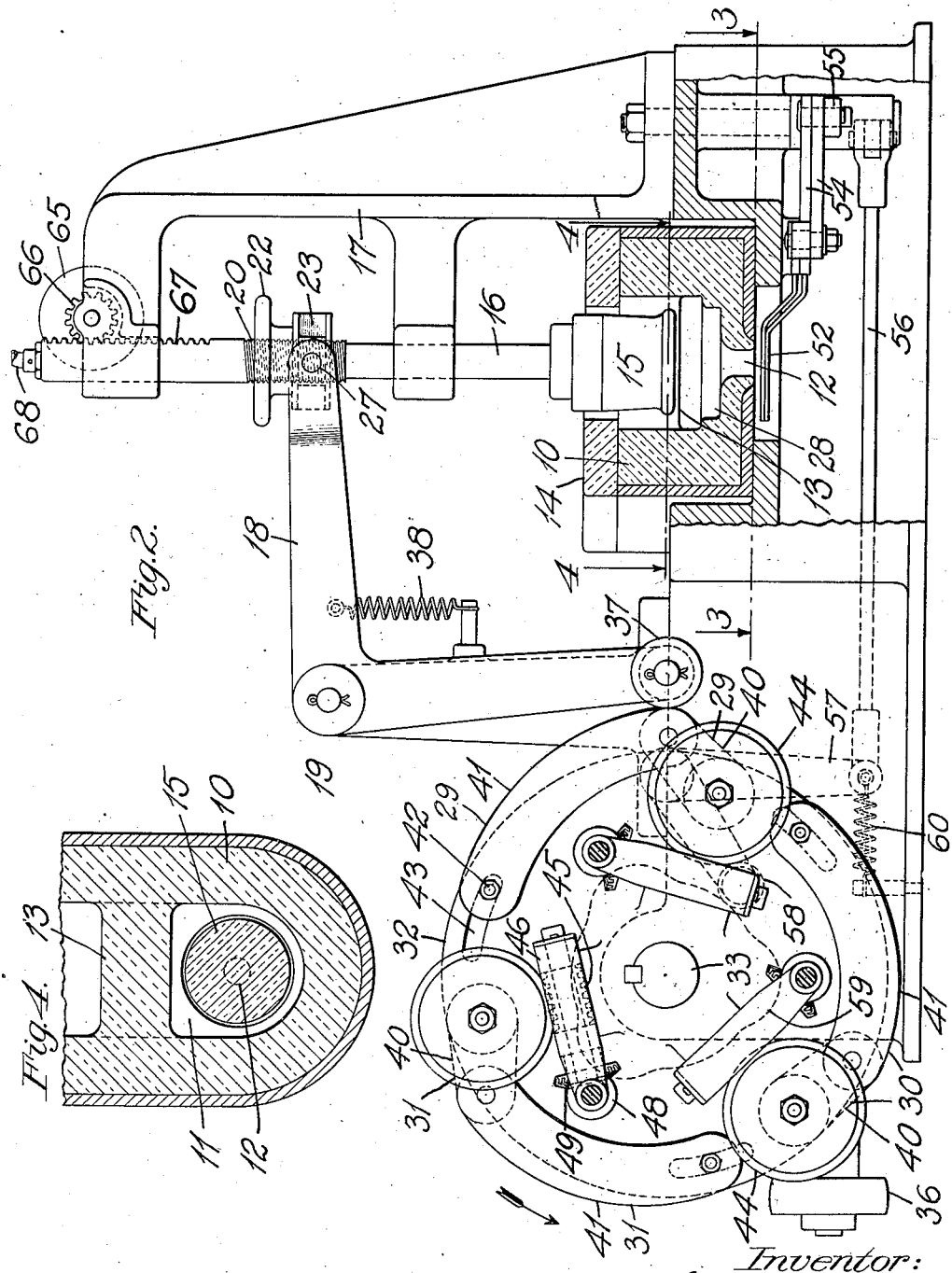

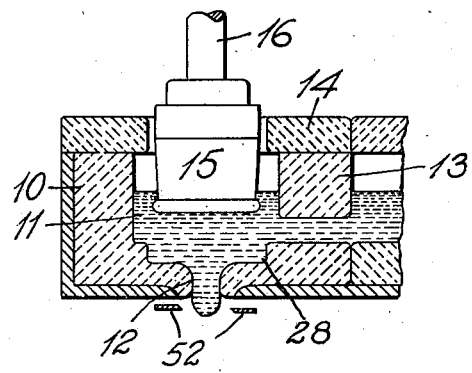
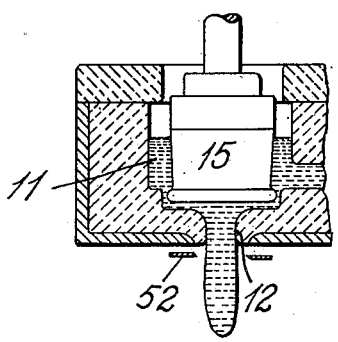
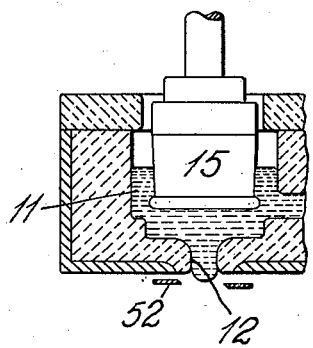
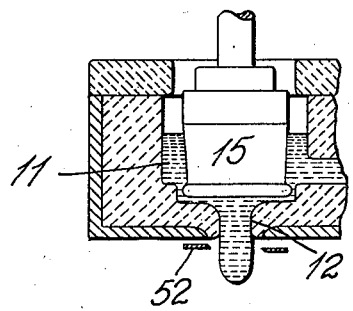
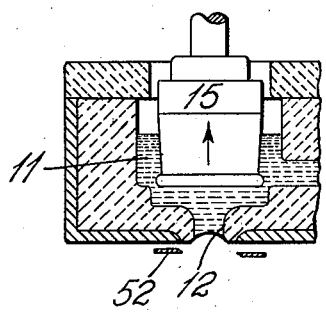

Patented Oct. 20, 1931

1,828,726

UNITED STATES PATENT OFFICE

WILLIAM A. LORENZ, OF HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed May 5, 1921. Serial No. 467,154.

This invention relates to the method of, and apparatus for obtaining mold charges of different predetermined weights from a melting furnace or other supply of molten glass by means of a single organized feeding machine, for delivery to a plurality of molds or glass shaping machines arranged in receiving relation to the feeding machine and adapted to mold or otherwise shape the charges into glassware of different weights. The means for distributing and delivering the charges formed by the feeder to several shaping machines forms no part of the present invention but a example of such an arrangement may be found in U. S. Patent No. 1,373,202 dated March 29, 1921 which discloses a single glass feeding machine arranged to distribute and deliver successive mold charges to the molds of two or more shaping machines.

One object of the present invention is to provide a new and improved method of making glassware of a plurality of different weights from a single supply of molten glass. A further object is to provide an apparatus for carrying this method into practical effect. To the accomplishment of this object, the apparatus of the present invention provides means for automatically segregating and feeding mold charges of molten glass, varying in size and weight in a predetermined order suited to the successive molds or shaping machines.

The invention contemplates the provision of a feeding machine which in one complete cycle of operation is made to produce mold charges of different weights in the order required by the successive molds or shaping machines.

These features of the invention and such others as may hereinafter appear will be best understood from the following description and accompanying drawings of a preferred embodiment of the apparatus, in which:—

Figure 1 is a plan view of the apparatus, showing a part of the forehearth of a glass furnace;

Fig. 2 is a vertical section substantially on the line 2—2 of Fig. 1;

Fig. 3 is a detail plan view taken in section on the line 3—3 of Fig. 2 and showing particularly the means for severing the mold charge;

Fig. 4 is a horizontal section through the forehearth, taken on the line 4—4 of Fig. 2;

Figs. 5 and 6 are vertical sections through the forehearth taken on the line 5—8 of Fig. 1, showing the operation of parts of the apparatus for producing mold charges of one size; and Figs. 7, 8 and 9 are similar views showing the operations of the parts for producing mold charges of another size.

The apparatus selected for the purpose of illustrating the invention is of that type in which a forehearth or boot connecting with a glass furnace or any other container of molten glass, is provided with a submerged outlet and a suitable implement, such as a plunger, is arranged to cooperate with the outlet to control the discharge of glass therethrough.

The container for the molten glass comprises a forehearth 10 (Figs. 1 and 2) of suitable refractory material, which may form an extension from a glass melting furnace and contains a pool of glass 11 into which the molten glass flows by gravity or otherwise from the furnace. The opening from the forehearth to the pool may be restricted by a gate 13 which may be adjusted in any well known way to regulate the flow of glass to the pool. Suitable covers 14 may be provided to close the top of the parts.

The glass is discharged from the pool through a submerged outlet 12 under the control of an implement movable toward and from the outlet. In the illustrated embodiment of the invention this implement is in the form of a plunger 15 of the usual refractory material, carried on the lower end of a rod 16 mounted to slide in suitable bearings formed on a standard 17. A well 28 somewhat larger than the plunger, is preferably provided above the orifice 12 in which the plunger operates during the lower portion of its stroke with a pump-like action. The action of the plunger on the glass may be varied by changes in the relative proportions of the plunger and the well, to secure the desired result.

The plunger is reciprocated by a bell crank 18 mounted on a fixed pivot 19. In order that the extent of movement of the plunger into the well may be easily adjusted, the connection between the bell crank 18 and the plunger rod 16 is made adjustable. For this purpose, the rod 16 is threaded at 20 to receive a hand wheel 22 resting on or having a swivel connection with a slotted block 23 engaging trunnions 27 on the forked end of the bell crank 18. By turning the hand wheel 22, the limit of the downward movement of the plunger may be varied to secure the desired working relation between the plunger 15, the well 28 and the outlet 12.

The extent of movement of the plunger 15 and its timing determine the sizes of the mold charges to be delivered. When the plunger is down it may act as a throttle to reduce or stop the flow through the orifice 12. A cessation in the discharge combined with a retraction of the glass in the orifice may be produced by the suctional action of the plunger as it moves upward. The retractive effect of the plunger on its upward stroke which may occur at any desired time, is illustrated in Fig. 9 in which the stub of glass depending from the outlet after severing, has been lifted from the shear blades and drawn up into the outlet where it is reheated to remelt the chilled shear scar, and incorporate it in the next mold charge. The size of the mold charge to be delivered depends upon the period of time that the glass is free to flow through the opening 12 and upon the extent of the extrusive action of the plunger when moving downwardly. With the apparatus illustrated in the accompanying drawings, the extent of the extrusive action of the plunger may be varied by varying the highest position of the plunger stroke while its lowest position remains constant. It is preferred to so proportion and arrange the parts, and their timing, that glass is extruded through the opening 12 mainly during the downward movement of the plunger so that the desired variations in the size and weight of the mold charges may be made by varying the length of the successive plunger strokes.

To this end the reciprocations of the plunger are controlled by a cam mechanism and in order to produce the periodic variations in the relative size of successive mold charges, a plurality of cam members are provided, one for each size of mold charge to be delivered, which members successively actuate the plunger 15. As illustrated in Figs. 1 and 2, the apparatus is capable of producing in a complete cycle of operation, three different mold charges in accordance with three cam members 29, 30 and 31 for use in molds of three varying sizes. Means are provided for independently adjusting the cam members to vary the size of any of the mold charges.

The cam members 29, 30 and 31 are mounted on a rotatable carrier, herein shown as a disc 32 driven by a shaft 33, worm gear 34, (Fig. 1), worm 35 and a pulley 36 connected by a belt to a suitable source of power. As the disc 32 is rotated in the direction of the arrow (Fig. 2), the cam members are successively brought in cooperation with a roll 37 mounted on the end of the vertical arm of the bell crank 18. A spring 38 holds the roll 37 against the disc 32 or cam members 29, 30 and 31 which together form in effect, a cam having three lobes, each of which is independently adjustable.

Each cam member comprises an arm 40 rotatably mounted in the disc 32 and having its free end pivotally connected with a link 41. The other end of the link carries a bolt 42 mounted to slide in a slot 43 in the disc. The toggle-like arrangement of the arm 40 and link 41 forms an adjustable cam rise projecting from the periphery of the disc 32 to an extent determined by the angular position of the arm 40. As the rise is increased to give a greater reciprocation to the plunger, the bolt 42 slides in the slot 43 and if desired, the bolt may be tightened in adjusted position to make this adjustment permanent.

In order that the cam members may be independently adjusted during the operation of the machine, each arm 40 is rigidly connected with a gear 44 (but one of which is shown in Fig. 1) in mesh with a worm 45 shown in dotted lines in Fig. 2, mounted in a bracket 46 fixed on the disc 32. The worm is turned to vary the angle of the arm 40 by a hand wheel 47 (Fig. 1) connected with a bevel gear 48 meshing with a gear 49 on the shaft of the worm 45. The hand wheels 47 project from the side of the disc 32 in such a position that they may be conveniently grasped by the operator and turned during the rotation of the disc 32, which at ordinary speeds of operation turns slowly enough for this purpose.

The extruded glass suspended below the outlet tends to assume a pear-shape having an attenuated neck connecting it with the glass in the outlet. The attenuation of the neck may be increased by the upward movement of the plunger 15 so that the successive mold charges or gobs may be more or less nearly separated, but it is preferred to provide severing means to cut the connection between successive gobs. For this purpose a pair of shears 52 are pivotally mounted at 53 (Fig. 3) and provided with extensions connected by links 54 with one arm of a lever 55, the other arm of which is connected by a rod 56 with a bell crank 57 crrying a roll 58. The roll is held in engagement with a cam 59 having a number of lobes corresponding to the number of cam members carried by the disc 32, by a spring 60 so as to produce a shearing action for each discharge produced by the cam member.

The sheer actuating cam 59 is mounted on and driven by the shaft 33 and in order that the timed relation between the severing operation and the discharge of the gather may be adjusted, the driving connection between the shear cam 59 and the plunger actuating cam mechanism is preferably adjustable. For this purpose the gear 34 and cam 59 may be formed integral and loosely mounted on the shaft 33. Adjustable driving connection between the gear 34 and the shaft 33 is provided by a flange 62 (Fig. 1) fixed on the shaft 33 by a key 63 and connected with the gear 34 by one or more screws 64 passing through elongated slots in the flange and threaded into the side of the gear. By this construction, the relation between the time of closing the shears 52 and the reciprocations of the plunger 15 may be varied by loosening the screw 64 which will permit the shear cam or the plunger actuating cam to be turned independently of the other, after which the parts will again be secured in position by tightening the screw 64.

The plunger may be raised out of the control of its actuating cams, by turning a hand wheel 65 carrying a gear 66 in mesh with a rack 67 formed on the rod 16 for any desirable purpose, as to permit the glass to feed temporarily by gravity alone or to permit convenient inspection or replacement of the plunger 15. Any suitable known means (not shown) may be provided if desired to releasably secure the plunger in raised position.

The plunger 15 and the rod 16 may be cooled if desired by circulating air or any suitable fluid through a pipe 68 (Fig. 2) in any well known way to prevent overheating of the parts.

The construction described provides a glass feeding machine which produces, in one complete cycle, two or more gobs or mold charges of different sizes and the size of each gob in the cycle may be independently adjusted during the continuous operation of the machine. The machine may of course be adjusted to produce a series of uniform charges if desired. The number of different sized gobs produced in a cycle may be increased by duplication of the cam members 29, 30 and 31 to the desired extent. The gobs produced by this apparatus may be distributed to the molds of a plurality of molding machines by mechanism such as is shown in the aforementioned patent, or the gobs may be delivered to a single turret having a series of molds of different sizes which are successively placed in receiving relation to the outlet 12 and to which gobs of appropriate size will be delivered.

The operation of the apparatus in carrying out the steps of this method, is shown particularly in Figs. 5 and 9. Fig. 5 shows the plunger 15 elevated to about its maximum height by the action of one of the cam members 29, 30 or 31, the cam member 29 (Fig. 2) being adjusted to produce substantially this amount of elevation. Fig. 6 shows the plunger at about the time of completing its extruding stroke. These two figures illustrate the formation of a large gather from which a large mold charge will be severed by the shears 53, such, for example, as indicated at 70 in Fig. 9.

Fig. 7 shows the plunger in its elevated position when a small charge is to be formed. The elevation of the plunger into this position might be effected by the cam member 31 with the adjustment shown in Fig. 2. Fig. 8 shows the plunger at about the time of completing its extruding stroke to form a small gather from which a small mold charge will be severed by the shears. The upward movement of the plunger may be employed to retract the stub of glass remaining after the charge has been severed, which condition is indicated approximately in Fig. 9. The sizes of the mold charges may be varied as desired by manipulation of the hand wheels 47 and any one of the cam members may be rendered inoperative by turning the hand wheel, so as to cause the arm 40 and the link 41 to coincide with or be retracted within the periphery of the disc 32 which will permit cam member to pass the roll 37 without actuating the plunger.

The invention has been illustrated in connection with a feeding machine of the type employing a plunger cooperating with a submerged outlet, but the invention in its broader scope is not limited to this particular charge obtaining mechanism. Having disclosed the basic principles of the invention in connection with this particular type of feeding machine, it is within the skill of an artisan to incorporate the broad idea of the invention in any of the well-known types of machines for obtaining mold charges from a mass of molten glass.

The nature and scope of the present invention having been indicated and the several steps in the practice of the method and one embodiment of the apparatus having been specifically described, what is claimed as new is:—

1. In apparatus for separating mold charges from a mass of molten glass in a container having an outlet, the combination of a plunger movable toward and from the outlet to control the discharge of glass therethrough, a rotatable carrier, a plurality of cam members mounted on the carrier, and a lever actuated by the cam members and connected to move the plunger, each of said cam members being adapted to cause a reciprocation of the plunger, and means for independently adjusting the cam members during the operation of the apparatus.

2. In apparatus for feeding molten glass, a glass container having a discharge outlet, an implement movable toward and from the outlet to periodically accelerate and retard discharge of glass through the outlet, and a cam having a contact portion for operating said implement, said contact portion being adjustable both angularly and radially in respect to the axis of rotation of the cam.

3. In apparatus for feeding molten glass, a glass container having a submerged outlet, an implement movable toward and from the outlet to periodically accelerate and retard discharge of glass through the outlet, and a cam for operating said implement, said cam comprising a carrier and a cam lobe comprising a pair of cooperative sections pivotally connected together at their adjacent ends, one of said sections being pivotally connected to the carrier and the other section being pivotally and slidably connected with the carrier whereby said cam lobe can be adjusted on the carrier to vary the extent of the portion thereof that projects beyond the periphery of the carrier.

4. In apparatus for feeding molten glass, a glass container having a discharge outlet, an implement movable toward and from the outlet to periodically accelerate and retard the discharge of glass through the outlet, a cam having a plurality of cam lobes, each adapted to cause a reciprocation of said implement, and means for adjusting said cam lobes angularly about the axis of rotation of the cam to vary the time intervals between successive reciprocations of the implement.

5. In apparatus for feeding molten glass in mold charges, a glass container having a discharge outlet, an implement movable toward and from the outlet to periodically accelerate and retard the discharge of glass through the outlet, means for operating said implement in successive cycles with a plurality of reciprocations of the implement occurring in each cycle and with the time intervals between successive reciprocations of the implement in each cycle irregular to vary the weight of the quantities of glass discharged through the outlet on successive reciprocations of the implement, and means for severing a mold charge from the discharged glass for each reciprocation of the implement.

6. In glass feeding apparatus, a glass container having a discharge outlet, an implement movable toward and from the outlet to periodically accelerate and retard the discharge of glass through the outlet, means for operating said implement in successive cycles, each comprising a plurality of reciprocations of the implement, means for severing a mold charge from the discharged glass for each reciprocation of the implement, and means for adjusting said implement operating means to vary in each cycle the relative durations of successive reciprocations of the implement to vary the sizes of the corresponding mold charges.

7. In glass feeding apparatus, a container for the glass having a discharge outlet, an implement movable toward and from the outlet to periodically accelerate and retard discharge of glass through the outlet, means for operating said implement in cycles, each comprising a plurality of unequal reciprocations of the implement, means for severing mold charges from discharged glass for each reciprocation of the implement, and means for varying the timed relation between the reciprocations of the implement of each cycle and the corresponding severing operations for that cycle.

8. The method of feeding molten glass from a delivery outlet of a glass container in mold charges in successive cycles, each cycle covering the discharge of a plurality of successive masses of independently regulable sizes, which comprises accelerating and retarding discharge of glass through the outlet a plurality of times in each cycle, regulating the relative sizes of the respective masses of glass discharged through the outlet in that cycle and in each subsequent cycle by regulating the time intervals between successive periods of accelerated and retarded discharge in a cycle, and severing a mold charge from each of said discharged masses.

9. The method of feeding molten glass from a delivery outlet of a glass container in mold charges in successive cycles, each cycle covering the discharge of a plurality of successive masses of independently regulable sizes, which comprises accelerating and retarding discharge of glass through the outlet a plurality of times in each cycle, regulating the relative sizes of the respective masses of glass discharged through the outlet in that cycle and in each subsequent cycle by regulating the durations of the periods of accelerated and retarded discharge in a cycle, and serving a mold charge from each of such discharged masses.

10. The method of feeding molten glass from a delivery outlet of a glass container in mold charges in successive cycles, each cycle covering the discharge of a plurality of successive masses of independently regulable sizes, which comprises accelerating and retarding discharge of glass through the outlet by moving an implement in the glass toward and from the outlet a plurality of times in each cycle, regulating the relative sizes of the respective masses of glass discharged through the outlet in that cycle and in each subsequent cycle by regulating the length of the strokes of the implement and the durations of the periods of accelerated and retarded discharge in a cycle, and severing a mold charge from each of such discharged masses.

11. The method of feeding molten glass from a delivery outlet of a glass container in mold charges in successive cycles, each cycle covering the discharge of a plurality of successive masses of independently regulable sizes, which comprises accelerating and retarding discharge of glass through the outlet a plurality of times in each cycle, regulating the relative sizes of the respective masses of glass discharged through the outlet in that cycle and in each subsequent cycle by regulating the durations of the periods of accelerated discharge in a cycle, and severing a mold charge from each of such discharged masses.

12. The method of feeding molten glass from a delivery outlet of a glass container in mold charges in successive cycles, each cycle covering the discharge of a plurality of successive masses of independently regulable sizes, which comprises accelerating and retarding discharge of glass through the outlet a plurality of times in each cycle, regulating the relative sizes of the respective masses of glass discharged through the outlet in that cycle and in each subsequent cycle by regulating the durations of the periods of retarded discharge in a cycle, and severing a mold charge from each of such discharged masses.

13. In glass feeding apparatus a container for the glass having a submerged outlet, an implement movable toward and from the outlet to periodically accelerate and retard discharge of glass through the outlet, and means for actuating said implement to periodically accelerate and retard flow of glass through the outlet, said actuating means being adjustable while in operation to vary the duration of a period of reciprocation of the implement without varying the time interval between the component strokes of that reciprocation.

14. In glass feeding apparatus, a container for the glass having a submerged outlet, an implement movable toward and from the outlet to periodically accelerate and retard discharge of glass through the outlet, and means for actuating said implement to periodically accelerate and retard flow of glass through the outlet, said actuating means being adjustable while in operation to simultaneously vary both the duration of a period of reciprocation of the implement and the length of a stroke of the implement during that reciprocation.

15. In glass feeding apparatus, a container for the glass having a submerged outlet, an implement movable toward and from the outlet to periodically accelerate and retard discharge of glass through the outlet, and means for actuating said implement to periodically accelerate and retard flow of glass through the outlet, said actuating means being adjustable while in operation to vary the duration of the retarding stroke in a reciprocation of the implement.

16. In glass feeding apparatus, a container for the glass having a submerged outlet, an implement movable toward and from the outlet to periodically accelerate and retard discharge of glass through the outlet, and means for actuating said implement to periodically accelerate and retard flow of glass through the outlet, said actuating means being adjustable while in operation to vary the duration of the accelerating stroke in a reciprocation of the implement.

Signed at Hartford, Conn., this 4th day of May, 1921.

WILLIAM A. LORENZ.